US006997479B2

(12) United States Patent
Desmarais et al.

(10) Patent No.: US 6,997,479 B2
(45) Date of Patent: Feb. 14, 2006

(54) MAGNETIC ADJUSTABLE TURNING LOOP

(75) Inventors: Robert J. Desmarais, Lake Orion, MI (US); David R. Arnold, Macomb, MI (US); Richard Boelstler, Lake Orion, MI (US)

(73) Assignee: Key Safety Systems, Inc., Sterling Heights, MI (US)

( * ) Notice: Subject to any disclaimer, the term of this patent is extended or adjusted under 35 U.S.C. 154(b) by 178 days.

(21) Appl. No.: 10/769,762

(22) Filed: Feb. 3, 2004

(65) Prior Publication Data

US 2005/0167971 A1 Aug. 4, 2005

(51) Int. Cl.
*B60R 22/20* (2006.01)

(52) U.S. Cl. .................... 280/801.2; 280/804
(58) Field of Classification Search ............ 280/801.2, 280/735, 804; 180/271, 268
See application file for complete search history.

(56) References Cited

U.S. PATENT DOCUMENTS

| 4,579,368 | A | * | 4/1986 | Kawade et al. | 280/801.2 |
| 4,702,493 | A | * | 10/1987 | Escaravage | 280/801.2 |
| 5,125,686 | A | * | 6/1992 | Yano et al. | 280/801.2 |
| 5,141,249 | A | * | 8/1992 | Saitoh et al. | 280/804 |
| 5,333,905 | A | * | 8/1994 | Watanabe | 280/801.2 |
| 5,655,793 | A | * | 8/1997 | Isonaga | 280/801.2 |
| 5,725,248 | A | * | 3/1998 | Inoue et al. | 280/801.2 |
| 6,334,629 | B1 | * | 1/2002 | Griesemer et al. | 280/801.2 |
| 6,361,069 | B1 | * | 3/2002 | Saito et al. | 280/730.2 |
| 6,511,093 | B2 | * | 1/2003 | Buerkle et al. | 280/729 |
| 6,733,041 | B2 | * | 5/2004 | Arnold et al. | 280/801.2 |
| 6,935,701 | B1 | * | 8/2005 | Arnold et al. | 297/473 |

* cited by examiner

*Primary Examiner*—David R. Dunn
*Assistant Examiner*—Drew J. Brown
(74) *Attorney, Agent, or Firm*—Lonnie R. Drayer

(57) ABSTRACT

A vehicle safety restraint adjuster has a vehicle safety restraint support and a guide for the support. The support is moveable along the guide. The adjuster further has a lock which secures the safety restraint support at a position on the guide in the locked state and allows the support to move in the unlocked state. A magnetic actuator selectively places the lock in the locked state and the unlocked state.

17 Claims, 3 Drawing Sheets

MAGNETIC ADJUSTABLE TURNING LOOP

BACKGROUND OF THE INVENTION

This invention relates to an adjustable turning loop for a vehicle safety restraint system.

A safety belt system is typically anchored to a vehicle at three different locations around a vehicle passenger. Two anchors support the lap belt portion of a safety belt while a third anchor, a loop or D-ring, located at the approximate height of the shoulder of the passenger provides support for the shoulder belt portion of the safety belt. Due to varying sizes of passengers, manufacturers use assemblies known as adjustable turning loops, which allow the shoulder loop to be adjusted up or down to accommodate these differing sizes. The adjustable turning loop has a button or other actuator that locks and unlocks the adjustable turning loop, generally located near the loop.

Typically, the adjustable turning loop is located near a side of the vehicle. Recently, side curtain air bags that deploy downwardly from the top of a door frame of the vehicle have been developed. Due to the proximity of the actuator to this air bag, deployment of the air bag may inadvertently cause the adjustable turning loop to become unlocked and thereby allow the loop to move at a point in time when the loop should be secured. Manufacturers have overcome this problem by placing shields above the actuator to deflect the downwardly deploying air bag. These shields may be cosmetically unsightly and add cost to the safety restraint system.

A need therefore exists for an adjustable turning loop assembly that avoids inadvertent actuation during air bag deployment without adding significant cost.

SUMMARY OF THE INVENTION

The present invention comprises an adjustable turning loop that has a support for a vehicle safety restraint and a guide that permits movement of the support along the guide. Like existing vehicle restraint adjusters, the inventive adjustable turning loop has a lock, which secures the support at a position on the guide in the locked state and, when unlocked, allows movement of the support along the guide. In contrast to existing adjustable turning loops, however, the inventive adjustable turning loop only allows unlocking of the lock in a direction opposite of an anticipated deployment of the side curtain air bag. In this way, deployment of the air bag does not move the actuator of the adjustable turning loop from the locked position to the unlocked position.

The inventive adjustable turning loop accomplishes this feature through a magnetic actuator that selectively moves the lock between the locked state or the unlocked state. The magnetic actuator has both a locked position and an unlocked position. In contrast to other assemblies, the unlocked position of the magnetic actuator is above the locked position. Accordingly, downward movement of a deploying air bag does not move the magnetic actuator from its locked position. No shield is required because the inventive adjustable turning loop allows for the downward movement of the deploying air bag. A spring may further bias the magnetic actuator to stay in the locked position.

The adjustable turning loop may comprise a web guide mounted to a slide. The slide is slideably received on a rail. Moreover, the magnetic actuator may be an electromagnet, which is controllable by a control unit by turning the magnetic actuator "on" and "off." In this way, the adjustable turning loop may be used with existing automated adjustable seatbelt systems.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
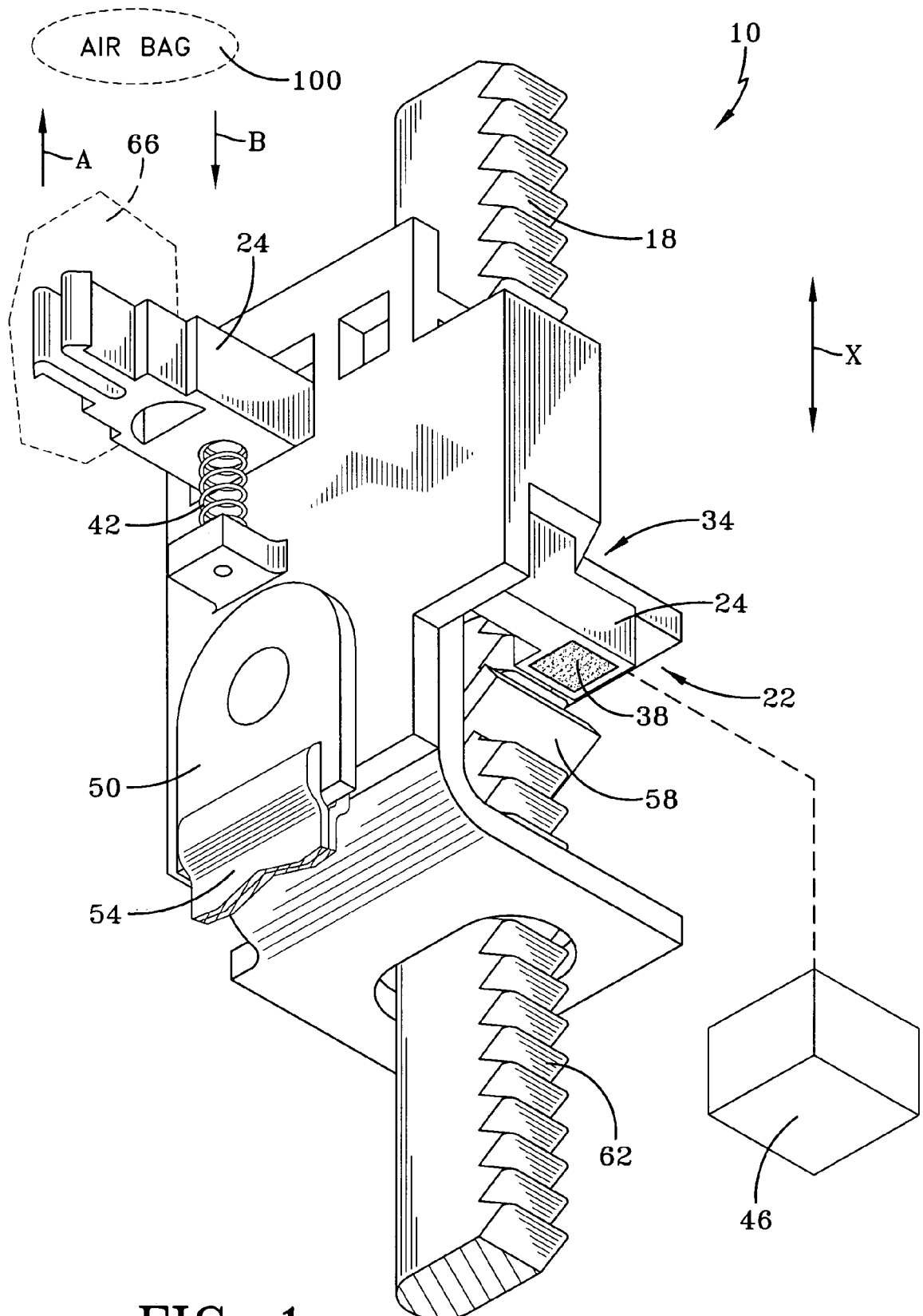
FIG. 1 illustrates a side perspective view of the inventive adjustable turning loop assembly, showing magnetic actuator, slide and rail.

FIG. 1 illustrates a side view of the inventive adjustable turning loop or more broadly vehicle safety restraint adjuster 10. Vehicle safety restraint adjuster 10 comprises vehicle safety restraint support 14, here a slide, which slideably mounts loop 50 for shoulder belt 54 on rail 18. Slide 14 is adjustable along the X-axis in an up and down direction like existing adjustable turning loop assemblies. However, in contrast to such assemblies, vehicle safety restraint adjuster 10 is unlocked by moving button 66 (shown by dashed lines) in the direction of arrow A, an upward direction. Adjustable turning loop is locked by moving button 66 in the direction of arrow B. Accordingly, an air bag deploying from the window frame of a vehicle in the direction of arrow B only forces button 66 more towards its locked position. In addition, as shown in FIG. 1, spring 42 is biased to maintain button 66 in the locked position.

Figure 2:
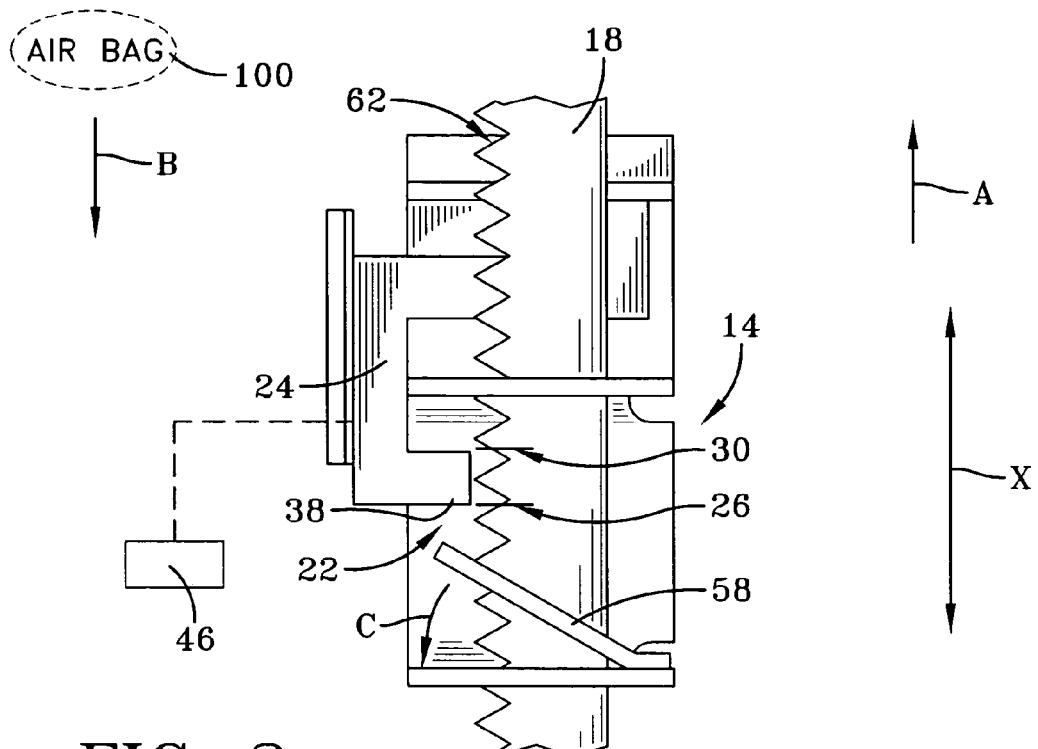
FIG. 2 illustrates an exposed behind view of the adjustable turning loop of FIG. 1 in the locked state.
Figure 3:
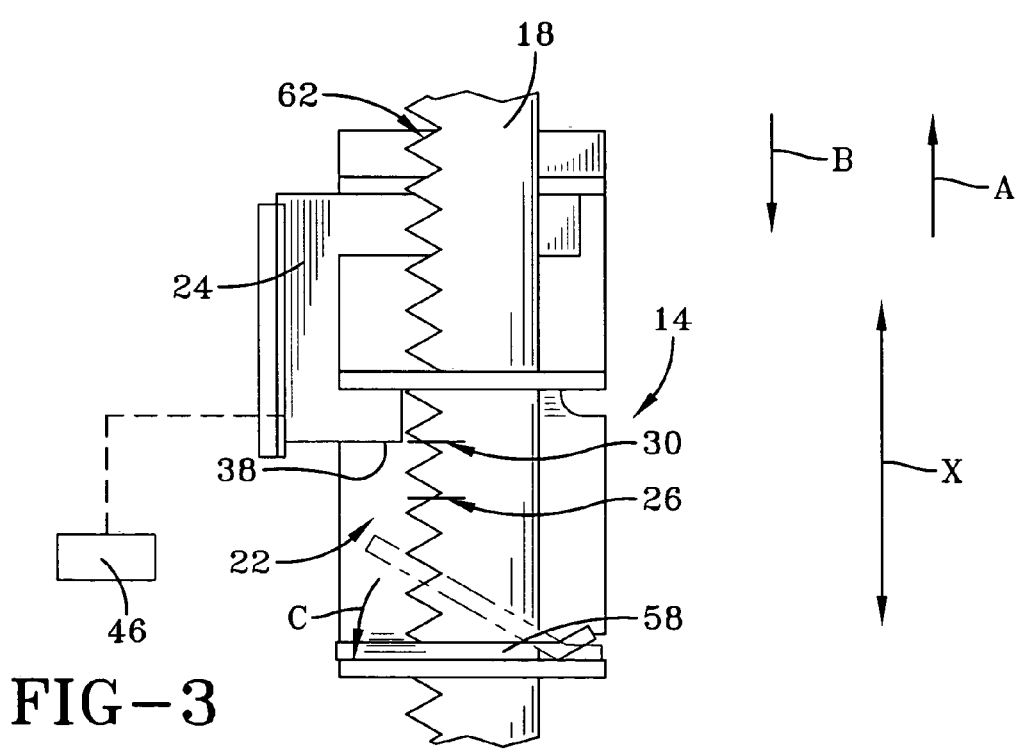
FIG. 3 illustrates the adjustable turning loop of FIG. 2 in the unlocked state.
Figure 4:
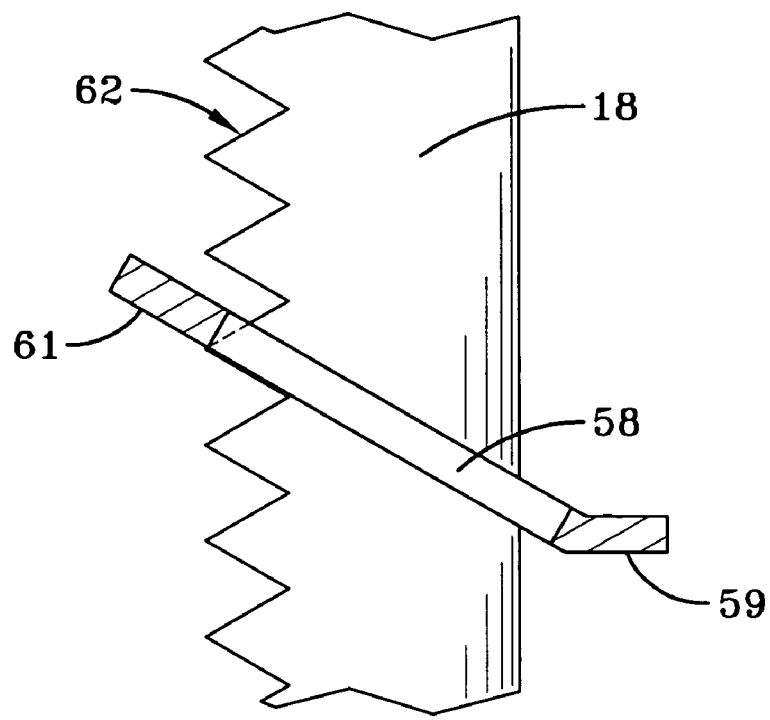
FIG. 4 illustrates a latch of the invention in the locked position.

The inner working of vehicle safety restraint adjuster 10 will now be explained with reference to FIGS. 2 and 3. FIG. 2 illustrates vehicle safety restraint adjuster 10 in the locked state while FIG. 3 illustrates the device in the unlocked state. In the looked state, button 86, which is mounted to arm 24, is held by spring 42 in locked position 26. Arm 24 is connected to button 66 on one end as shown in FIG. 1 and supports magnet 38 at the other end as shown in FIG. 2. Magnet 38 serves to hold up latch 58, which is made of a magnetic receptive material, through magnetic force. Latch 58 is pivotally mounted to slide 14. Magnet 38 may be an electromagnet, which is controlled by control unit 46 to be "on" or "off." Latch 58 serves to lock slide 14 in place by engaging teeth 62 of rail 18 as shown by cross-section in FIG. 4. In this way, slide 14 is held at locked position 26 on rail 18. Moreover, downward movement of an air bag 100 in the direction of arrow B does not cause magnet 38 to change its position so that inadvertent unlocking of the adjustable turning loop may be avoided.

Figure 5:
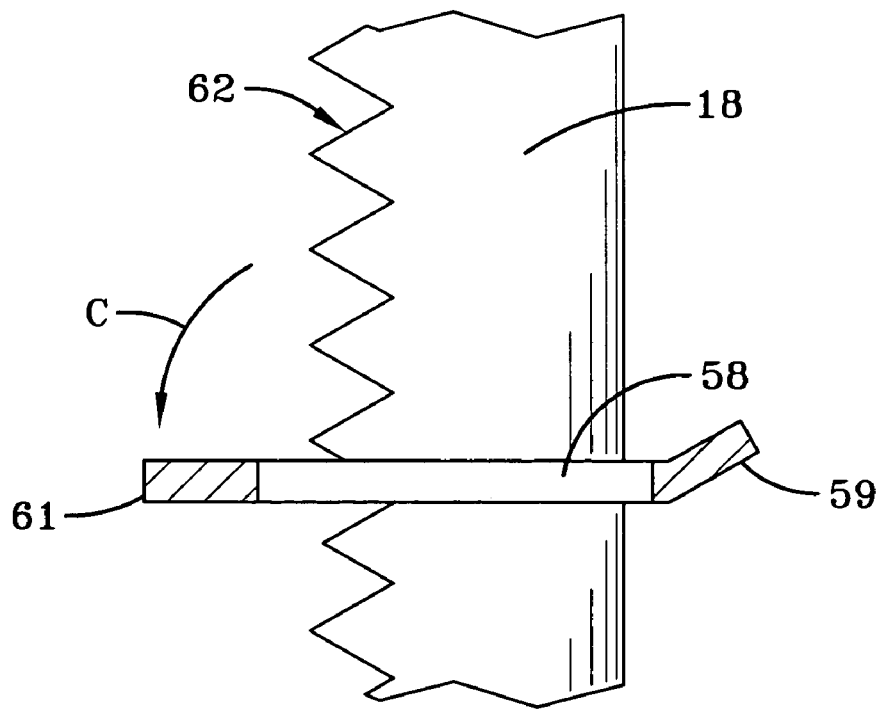
FIG. 5 illustrates the latch of FIG. 4 in the unlocked position.

To unlock adjustable turning loop 10, as shown in FIG. 1 and FIG. 3, button 66 and consequently arm 24 is moved in the direction of arrow A, an upward direction. Thus, magnet 38 moves from locked position 26 to unlocked position 30, a position higher than locked position 26 and further away from latch 58. Upward movement of button 66 will cause slide 14 to be moved upward. Consequently, while portion 59 of latch 58 will rise with slide 14, portion 61 of latch 58 will fall with gravity so as to disengage from teeth 62 of rail 18 as shown by cross-section in FIG. 5. Slide 14 may accordingly be moved up or down along the X-axis. Following adjustment of slide 14 to a desired height, button 66 is released allowing spring 42 to draw arm 24 to locked position 26. It should be noted that in this particular embodiment, magnet 38 need not be in contact with latch 58 to hold latch 58 in place. There need only be sufficient magnetic force to suspend latch 58 in the locked position.

The aforementioned description is exemplary rather that limiting. Many modifications and variations of the present invention are possible in light of the above teachings. The preferred embodiments of this invention have been disclosed. However, one of ordinary skill in the art would recognize that certain modifications would come within the scope of this invention. Hence, within the scope of the appended claims, the invention may be practiced otherwise than as specifically described. For this reason the following claims should be studied to determine the true scope and content of this invention.

What is claimed is:

1. A vehicle safety restraint adjuster comprising:
   a vehicle safety restraint support;
   a guide for said vehicle safety restraint support, said vehicle safety restraint support movable along said guide;
   a lock having a locked state and an unlocked state, said lock for securing said vehicle safety restraint support at a position on said guide in said locked state and said lock for releasing said vehicle safety restraint support for movement in said unlocked state; and
   a magnetic actuator for selectively placing said lock in said locked state and said unlocked state, wherein said locked state comprises a locked position of said magnetic actuator and said unlocked state comprises an unlocked posistion of said magnetic actuator.

2. The vehicle safety restraint adjuster of claim 1 wherein said magnetic actuator is biased to be in said locked state.

3. The vehicle safety restraint adjuster of claim 2 wherein a spring biases said magnetic actuator to be in said locked state.

4. The vehicle safety restraint adjuster of claim 1 wherein said vehicle safety restraint support comprises a slide slideably received on said guide.

5. The vehicle safety restraint adjuster of claim 4 wherein said guide comprises a rail, said slide disposed on said rail.

6. The vehicle safety restraint adjuster of claim 1 wherein said vehicle safety restraint support comprises a web guide support.

7. The vehicle safety restraint adjuster of claim 1 wherein said magnetic actuator comprises an electromagnet.

8. The vehicle restraint adjuster of claim 7 including a control unit in communication with said electromagnet, said control unit controlling placement of said lock in said locked state and said unlocked state.

9. A height adjuster assembly comprising:
   a web guide having a path of travel;
   a lock having a locked state and an unlocked state, said lock for securing said web guide at a position on said path of travel in said locked state and said lock for releasing said web guide for movement along said path of travel in said unlocked state;
   a lock actuator having a locked position and an unlocked position, said locked position placing said lock in said locked state and said unlocked position placing said lock in said unlocked state; and
   wherein movement of said lock actuator from said locked position to said unlocked position is along a first direction and an anticipated direction of deployment of an air bag is along a second direction, said second direction having a component generally opposite to said first direction so as to maintain said lock in said locked state.

10. The height adjuster assembly of claim 9 wherein said lock actuator is biased to be in said locked position.

11. The height adjuster assembly of claim 10 wherein a resilient member biases said lock actuator to be in said locked position.

12. The height adjuster assembly of claim 9 including a slide and a rail defining said path of travel, said web guide mounted to said slide and said slide slideably received on said rail.

13. The height adjuster assembly of claim 12 wherein said lock and said actuator are mounted to said slide.

14. The height adjuster assembly of claim 9 wherein said lock actuator comprises a magnetic actuator.

15. The height adjuster assembly of claim 14 wherein said magnetic actuator is an electromagnet.

16. The height adjuster of claim 15 including a control unit in communication with said electromagnet, said control unit controlling placement of said lock in said locked state and said unlocked state.

17. A vehicle restraint assembly comprising:
   an air bag having an anticipated direction of deployment;
   a web guide having a path of travel;
   a lock having a locked state and an unlocked state, said lock for securing said web guide, at a position on said path of travel in said locked state and said lock for releasing said web guide for movement along said path of travel in said unlocked state;
   a lock actuator having a locked position and an unlocked position, said locked position placing said lock in said locked state and said unlocked position placing said lock in said unlocked state; and
   wherein movement of said lock actuator from said locked position to said unlocked position is along a first direction and said anticipated direction of deployment is along a second direction, said second direction having a component generally opposite to said first direction so as to maintain said lock in said locked state.

* * * * *